Sept. 18, 1945.  C. S. KELLEY  2,385,139
VARIABLE LOAD BRAKE
Filed Aug. 29, 1942
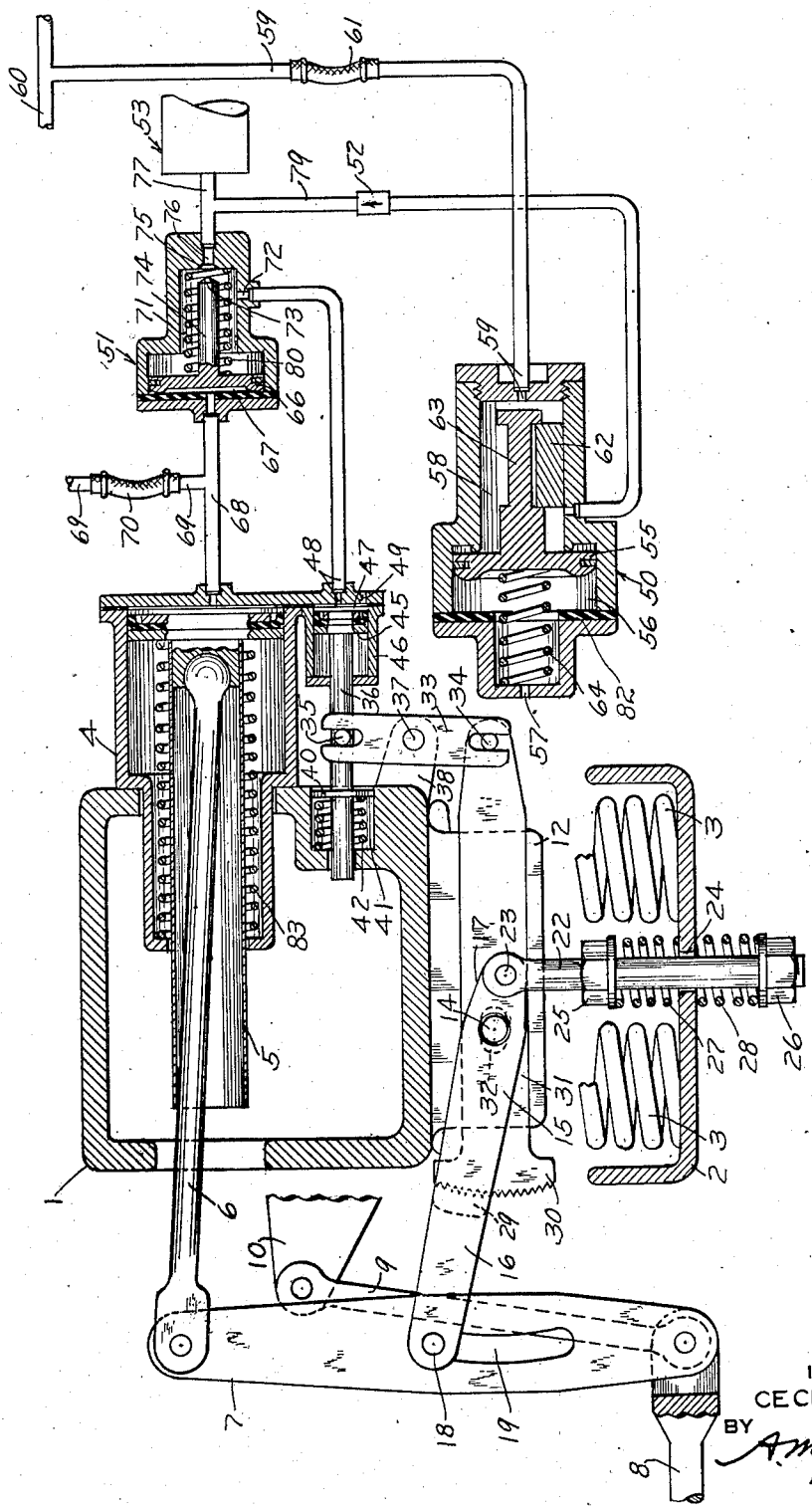
INVENTOR
CECIL S. KELLEY
BY
A. M. Higgins
ATTORNEY Patented Sept. 18, 1945

2,385,139

UNITED STATES PATENT OFFICE 2,385,139

VARIABLE LOAD BRAKE

Cecil S. Kelley, Forest Hills, Pa., assignor to The Westinghouse Air Brake Company, Wilmerding, Pa., a corporation of Pennsylvania Application August 29, 1942, Serial No. 456,583

3 Claims. (Cl. 188—195)

This invention relates to railway vehicle brake apparatus and more particularly to variable load brake apparatus of the type in which the brake rigging leverage thereof may be automatically varied in accordance with variations in the weight of the load on the vehicle to correspondingly vary the force with which the brake is adapted to be applied.

An object of the invention is to provide an improved variable load brake apparatus of the above mentioned type.

Another object of the invention is to provide a variable load brake apparatus of the above type which is so constructed and arranged that, when the fluid under pressure in the brake system is being increased in charging, it will be automatically conditioned or changed over for the degree of braking required for the weight of the load carried, and which, when the pressure of fluid in the brake system exceeds a predetermined limit, will be automatically locked and maintained locked in its conditioned state so long as the pressure of fluid in the system is not reduced below said predetermined limit.

It is a further object of the invention to provide a variable load brake apparatus of the above mentioned type including novel means which permits variations in the brake rigging leverage only when the pressure in the brake system is within a predetermined range and then only when the brake rigging is in its released position.

Other objects and advantages will appear in the following detailed description of the invention.

The single figure is a diagrammatic view, partly in section of a railway vehicle truck embodying the invention, parts of the truck and of the brake rigging being omitted to more clearly illustrate certain details of the invention.

As shown in the drawing, the variable load brake apparatus is applied to a railway vehicle truck which may be of the usual well known construction having a truck bolster 1, laterally spaced side frames (not shown) which are rigidly carried in the usual manner by the wheel and axle assemblies (not shown) and a spring plank 2 which is fixed to the truck frames and upon which the usual truck bolster supporting springs 3 seat.

The variable load brake apparatus may comprise a brake cylinder device 4 having a cylinder which is rigidly secured to the truck bolster 1 and which contains the usual piston having a hollow piston rod 5 which projects beyond one end of the cylinder and in which is rockably mounted the usual push rod 6. The outer end of the push rod 6 is operatively connected to the upper end of a vertically disposed brake cylinder lever 7, the lower end of the lever being operatively connected to one end of a usual longitudinally extending pull rod 8 leading to other brake rigging elements, not shown, which actuate the usual friction braking elements into and out of braking engagement with the wheel and axle assemblies of the vehicle truck. The lower end of the brake cylinder lever 7 is also connected to one end of a brake hanger 9 which hanger at its opposite end is connected to a bracket 10 carried by a side frame or other unsprung part of the truck.

Rigidly attached to the bolster 1 and extending downwardly from the lower side thereof is a bracket 12 which carries a pin 14 upon which is rockably mounted a lever 15 which extends transversely of the bolster. At one side of the pin 14 the lever comprises an arm 16 which projects beyond one side of the truck bolster, and at the other side the lever comprises an arm 17, the arm 16 being of greater length than the arm 17.

The outer end of the arm 16 carries a pin 18 which passes through a slotted opening 19 formed in the brake cylinder lever 7 intermediate its ends. This pin serves as a fulcrum for the lever.

The outer end of the arm 17 is connected to the upper end of a vertically extending rod 22 by means of a pin 23, which rod extends through a suitable opening 24 provided in the spring plank 2. The rod 22 is provided with two adjustable spring seats 25 and 26, in the form of nuts having screw-threaded engagement with the rod, and which are disposed adjacent the upper and lower sides of the spring plank, respectively.

Interposed between the spring seat 25 and the upper side of the spring plank is a spring 27 and interposed between the spring seat 26 and the lower side of the spring plank is a spring 28 for a purpose hereinafter described.

The arm 16 of the lever 15 is provided, at a point intermediate the pins 14 and 18, with a serrated or toothed locking portion or segment 29 which is adapted to be engaged by a correspondingly shaped toothed locking portion 30 which is carried by one end of a member 31 which member may be termed a latch. The latch member 31 extends transversely of the bolster and is preferably arranged parallel with the lower side thereof and is slidably mounted in the bracket 12 for longitudinal movement relative to the bolster. Intermediate its ends the latch member is provided with a slotted opening 32 through which the pin 14 extends. The other end of the latch member is operatively connected to the lower end of a vertically extending lever 33 by means of a pin 34.

The lever 33 is operatively connected at its opposite end by means of a pin 35 to a horizontally extending operating rod 36 and is pivotally mounted intermediate its ends on a pin 37 carried by a bracket 38 projecting from the bolster 1.

The rod 36 is movable longitudinally to rock the lever 33 about the pivot pin 37 to actuate the latch member 31 and thereby the toothed locking portion 30 of the member into and out of locking engagement with the toothed portion 29 on the arm 16 of the lever 15. At one side of the pin 35, the rod 36 is provided with a spring seat 40 which is slidably mounted in a bore 41 formed in the bolster 1. Interposed between one side of this spring seat and the inner wall of the bore is a spring 42 which tends, at all times, to move the spring seat in a direction toward the lever 33.

At the opposite side of the pin 35, the rod 36 is provided with a piston 45 which is operatively mounted in a reset cylinder 46 having a piston chamber 47 which is in constant open communication with a passage and pipe 48 and which is also connected to the atmosphere by way of a restricted passage 49.

The apparatus for controlling the operation of the piston 45 and thereby the rod 36 may comprise a change-over control valve device 50, a cut-off valve device 51, a check valve device 52 and a volume reservoir 53.

The change-over control valve device 50 may comprise a casing in which there is slidably mounted a piston 55. At one side of this piston there is a chamber 56 which is constantly connected through a passage 57 with the atmosphere. At the opposite side of the piston there is a valve chamber 58 which is constantly connected through a communication with the usual brake pipe 60. This communication comprises two separate pipes 59 which are connected together by means of a flexible hose 61, which hose accommodates lateral relative movement between the sprung and unsprung parts of the vehicle.

Contained in valve chamber 58 of the valve device 50 is a slide valve 62 which is adapted to be operated by a piston stem 63 carried by the piston 55. Contained in chamber 56 and acting on the piston is a spring 64 which, at all times, tends to urge the piston, piston stem and slide valve toward the position in which they are shown in the drawing.

The cut-off valve device 51 may comprise a casing in which there is slidably mounted a piston 66. At one side of this piston there is a chamber 67 which is in constant open communication with a pipe 68 leading to the brake cylinder device 4 which pipe in turn is connected to a communication leading to the brake cylinder port of a brake controlling valve device not shown, said communication comprising two separate pipes 69 which are connected together by means of a flexible hose 70 to accommodate relative movement between the truck and the body of the vehicle. At the opposite side of the piston 66 there is a valve chamber 71 which is constantly connected through a passage 72 with the pipe 48.

Contained in valve chamber 71 is a valve 73 arranged at the outer end of a piston stem 74 carried by the piston 66. This valve is arranged to be moved into and out of seating engagement with a valve seat 75 formed in the casing and surrounding a passage 76, which passage is connected to a pipe 77 leading to the volume reservoir 53. The pipe 77 is also connected to a pipe 79 leading from the seat for the slide valve 62 in the change-over control valve device 50, the check valve 52 being interposed in this pipe to prevent flow of fluid from the pipe 77 to the slide valve chamber 58. Also contained in valve chamber 71 is a spring 80 which tends at all times to urge the piston 66, piston stem 74 and valve 73 to the position in which they are shown in the drawing.

It will be understood that as the load carried by the truck bolster increases, the usual truck bolster supporting springs 3 will be compressed, so that the truck bolster 1 will move downwardly relative to the spring plank 2 and that this movement will always be proportional to the degree of the load, starting from empty and progressing to a maximum point at full load. As this movement is occurring the lever 15, if not locked, will be caused to rock in a counterclockwise direction about the pin 23, the spring 27 being sufficiently strong to resist deflection.

Rotation of the lever 15 in a counterclockwise direction causes the fulcrum pin 18 to move downwardly relative to the brake cylinder lever 7 within the slotted opening 19. It will be obvious that any variation in the position of the pin 18 with relation to the brake cylinder lever 7 in this direction will result in an increase in the leverage of the apparatus and thereby an increase in the braking power of the brake rigging when the rigging is actuated to apply the brakes.

If the load on the truck bolster has been decreased and the lever 15 is unlocked the springs 3 will act to move the truck bolster upwardly which movement causes the lever to rock in a clockwise direction about the pin 23, the spring 28 being strong enough to resist deflection.

Rotation of the lever 15 in a clockwise direction causes the fulcrum pin 18 to move upwardly relative to the lever 7 within the slotted opening 19. Any variation of the position of the pin in this direction will result in a decrease in the leverage of the apparatus and thereby a decrease in the braking power of the rigging when the rigging is actuated to apply the brakes.

It will here be understood that both trucks of a vehicle are provided with the hereinbefore described variable load brake apparatus, the braking effect on each truck will be in accordance with the weight of the load carried by the truck, so that if there is a heavier load carried by one truck than by the other, the more heavily loaded truck will be braked heavier than the lightly loaded truck.

*Operation*

Assuming the vehicle, embodying the invention, to be empty and separated from a train, the brakes on the vehicle released and the brake pipe of the vehicle deplete of fluid under pressure. Under these conditions the several parts of the equipment will be in the position illustrated in the drawing.

Now when the empty vehicle is placed in a train, the brake pipe 60 will of course be supplied with fluid under pressure, the brake pipe throughout the train being fully charged to the normal pressure carried before the train is put in motion.

Fluid under pressure supplied to the brake pipe flows through the pipe and passage 59 and flexible hose 61 to the valve chamber 58 of the change-over control valve device 50. With the change-over control valve slide valve 62 in its innermost position, as shown in the drawing, fluid under pressure flows from the valve chamber 58 through pipe 79, past check valve 52 and through pipe 77 to the volume reservoir 53 and to the valve chamber 71 of the cut-off valve device 51, the flow of fluid to the valve chamber being by way of passage 76 and past unseated valve 73. The change-over control valve piston and slide valve remain in this position until the pressure of fluid in valve chamber 58 has been increased sufficiently to cause the piston and slide valve to move outwardly against the opposing pressure of the spring 64. As will hereinafter more fully appear, an increase in the pressure of fluid in the valve chamber 58 to thirty pounds will cause the piston and slide valve to move against the opposing pressure of spring 64 to a position in which the slide valve 62 cuts off communication between valve chamber 58 and pipe 79.

Fluid under pressure supplied to valve chamber 71 of the cut-off valve device 51 flows to the piston chamber 47 in the reset cylinder 46 by way of passage 72 and passage and pipe 48. It will here be noted that fluid under pressure thus supplied to chamber 47 is at a faster rate, than it can be vented therefrom through the restricted passage 49. As a result the pressure of fluid in chamber 47 is increased, thereby causing the piston 45 and attached rod 36 to move longitudinally in a direction toward the left-hand, as viewed in the drawing, against the opposing pressure of spring 42.

Movement of the rod 36 in this direction causes the attached lever 33 to rock in a counterclockwise direction about the pivot pin 37. The lever as it is thus moved acts to shift the latch member 31 in a direction toward the right hand, thereby causing the locking teeth of the segment 30 to move out of locking engagement with the teeth of the segment 29 carried by the fulcrum shifting lever 15. The locking element 30 is thus moved out of engagement with the toothed portion 29 of the lever 15, thereby unlocking the lever 15.

Since the vehicle is empty the truck bolster 1 will be in its normal position and as a consequence the lever 15 will remain in the position in which it is shown so that the fulcrum pin 18 will remain positioned in the upper end of the slotted opening 19 in the brake cylinder lever 7.

When the pressure of fluid in chamber 58 of the change-over control valve device 50 has been increased to about thirty pounds, the piston 55 will be caused to move outwardly against the opposing pressure of the spring 64 until brought to a stop by its engagement with a gasket 82 which is rigidly secured to the casing.

With the change-over control valve piston 55 in this position the slide valve 62 will have been moved to a position in which it cuts off communication between chamber 58 and pipe 79, thus cutting off the flow of fluid under pressure from chamber 58 to piston chamber 47 in the reset cylinder 46. With the supply of fluid under pressure to chamber 47 thus cut off, fluid under pressure in chamber 47, connected passage and pipe 48, chamber 71 of the cut-off valve device 51, pipe 77 and volume reservoir 53 is vented to the atmosphere by way of restricted passage 49.

When the pressure of fluid in chamber 47 has been reduced sufficiently, the spring 42 acting through the medium of the spring seat 40 will cause the rod 36 and attached piston 45 to move in a direction toward the right hand into the position in which they are shown in the drawing.

Movement of the rod 36 in this direction will cause the attached lever 33 to rock in a clockwise direction about the pivot pin 37. The lever 33 as it is thus rocked acts to shift the latch member 31 in a direction toward the left hand thereby causing the toothed locking portion 30 to move into locking engagement with toothed portion 29 of the lever 15, thus locking the lever 15 so as to maintain the fulcrum pin 18 positioned at the upper end of the slotted opening 19. With the fulcrum pin 18 thus locked in position, the brake rigging it now conditioned for operation to provide the proper braking for the empty vehicle.

It should here be mentioned that when the vehicle is in transit and the fulcrum pin 18 is locked in any position within the slotted opening 19 by interengagement of the teeth on the locking portion 30 of the latch member 31 and the toothed portion 29 of the lever 15, relative motion between the truck bolster 1 and the spring plank 2 will be cushioned by either the spring 27 or by the spring 28, depending upon the direction of such movement. This spring cushioning arrangement will prevent excessively heavy shocks, due to such relative movement from being imposed upon the lever and thereby upon the locking portions of the lever and latch member.

When it is desired to effect an application of the brakes fluid under pressure may be supplied to pipe 69 in the usual manner by a brake controlling valve device which may be of the K or AB type. Fluid under pressure supplied to pipe 69 flows therefrom by way of pipe 68 to the brake cylinder 4 causing the brake cylinder piston, hollow piston rod 5 and push rod 6 to move in a direction toward the left hand against the opposing pressure of the usual release spring 83. As the push rod 6 moves in a direction toward the left hand it actuates the brake cylinder lever 7 to move the pull rod 8 to cause the brake shoes (not shown) to frictionally engage the tread of the truck wheels.

At the same time, fluid under pressure supplied to pipe 68 flows to chamber 67 in the cut-off valve device 51. Fluid under pressure thus supplied to chamber 67 causes the piston 66 and attached stem 74 to move in a direction toward the right hand against the opposing pressure of the spring 80 until the valve 73 is moved into seating engagement with its seat 75. With the valve 73 thus seated communication is cut off between passage 76 and chamber 71 in the cut-off valve device 51. The purpose of this is to prevent any repositioning of the fulcrum pin 18 at any time while the brakes are applied, as will hereinafter more fully appear.

Assuming now that, while the vehicle is separated from a train and the brake pipe deplete of fluid under pressure, lading is placed on the body of the vehicle. Under the influence of the additional weight which the lading imposes on the truck bolster 1, the bolster springs 3 will yield and permit the bolster 1 to move downwardly relative to the spring plank 2. As the bolster thus moves, the spring 27 is compressed since, at this time, the locking portion 30 of the latch member is maintained in locking engagement with the locking portion 29 of the lever 15.

Now when the loading of the vehicle is completed and the vehicle is placed in a train and the brake pipe charged with fluid under pressure, the latch member 31 is caused to be shifted out of locking engagement with the toothed portion 29 of the lever 15, in the same manner as before described in connection with the adjustment of the brake rigging for empty braking.

When the teeth of locking portion 30 of the latch member are moved out of locking engagement with the toothed portion 29 of the lever 15, the spring 27, which as before mentioned has sufficient initial tension to resist deflection when the lever is unlocked, will act through the medium of spring seat 25, rod 22 and pin 23 to move the arm 17 of lever 15 upwardly. This upward movement of arm 17 causes the lever 15 to rock in a counterclockwise direction about the pin 14. This rocking movement of the lever 15 thus causes the arm 16 at the other side of the pin 14 to move downwardly and carries the fulcrum pin 18 with it, the pin 18 moving in the slotted opening 19 in the brake cylinder lever 7. From this it will be understood that the fulcrum pin 18 will be automatically positioned relative to the brake cylinder lever 7 to provide for the degree of braking called for by the weight of the lading placed on the vehicle.

Now when the pressure in the brake pipe has been increased to about thirty pounds the lever 15 and thereby fulcrum pin 18 will be locked in its adjusted position in identically the same manner as hereinbefore described in connection with the adjustment of the braking rigging for one empty vehicle. The fulcrum pin 18 will be maintained in its adjusted position by the locked lever 15 until the fluid under pressure in the brake pipe 60 is again depleted when the change-over control valve device will be conditioned for effecting adjustment of the lever in accordance with the load when the system is again recharged.

When the lever 15 and fulcrum pin 18 are locked against rocking movement, the springs 26 and 27, serve to cushion or dampen the shocks which may be transmitted from the bolster to the lever as the bolster moves vertically relative to the lever under the influence of the usual shocks to which the vehicle is subjected in service.

In setting a car out of a train the usual hose couplings (not shown) between cars are parted which permits the brake pipe pressure to reduce rapidly to atmospheric pressure. This rapid reduction in brake pipe pressure causes any of the well known brake controlling valve devices such for example as the "AB" valve shown and described in the Westinghouse Air Brake Company, instruction pamphlet 5062, acting in the usual manner, to supply fluid under pressure to the brake cylinder to effect an application of the brakes.

In effecting such an application of the brakes fluid under pressure supplied to the brake cylinder 4 also flows to chamber 67 of the cut-off valve device 51 thus causing the valve 73 therein to be moved into seating engagement with its seat 75 to cut off communication between passage 76 and chamber 71, in the manner already described in connection with a service application of the brakes. When the brake pipe pressure has been reduced below thirty pounds, the change-over control valve device 50 will operate to connect valve chamber 58 therein to pipe 79.

When the car is again connected in a train and it is desired to effect a release of the brakes following such an application, fluid under pressure is supplied to the brake pipe in the usual well known manner, from whence it flows to the valve chamber 58 of the brake controlling valve device 50 through the circuit hereinbefore traced in connection with charging an empty vehicle.

As will be understood from the foregoing description the change-over control valve device 50 will, at this time, be in the position as illustrated in the drawing and the cut-off valve device 51 will be in its opposite position; that is, in a position in which valve 73 cuts off communication between passage 76 and chamber 71. Since the change-over control valve device and the cut-off valve device are thus positioned fluid under pressure supplied to valve chamber 58 of the change-over control valve device flows by way of pipe 79, past check valve 52 and pipe 77 to the volume reservoir 53, the valve 73 cutting off the flow of fluid under pressure from pipe 77 to chamber 71 in the cut-off valve device.

When the pressure of fluid in chamber 58 of the change-over control valve device 50 and consequently in volume reservoir 53 has been increased to approximately thirty pounds the change-over control valve device will function as hereinbefore described to cut-off communication between valve chamber 58 and pipe 79.

Now when the pressure of fluid in the brake pipe 60 has been increased to a degree sufficient to effect operation of the brake controlling valve device (not shown) to release position which is approximately fifty pounds with the "AB" control valve device, the pipe 69 will be connected to the atmosphere in the usual manner thereby venting fluid under pressure from the pipe 68 and connected brake cylinder 4 and chamber 67 of the cut-off valve device 51. When this occurs the release spring 83 in the brake cylinder 4 will cause the brake cylinder piston and the tubular piston rod 5 to move to release position as shown, thereby permitting push rod 6 and the cylinder lever 7 to move to their release position, thus the brakes are released.

At the same time the spring 80, in the cut-off valve device 51, will act, due to the reduction in pressure in chamber 67, to move the piston 66 and thereby the valve 73 into the position in which it is shown in the drawing, thus unseating valve 73.

With the valve 73 thus unseated fluid under pressure stored during the charging of the brake pipe in volume reservoir 53 flows to chamber 47 of the reset cylinder 46 by way of pipe 77, passage 76, past unseated valve 73, chamber 71 in the cut-off valve device 51, passage 72 and pipe and passage 48. Since as before mentioned the supply of fluid under pressure to chamber 47 by way of pipe and passage 48 is at a faster rate than it can be released from the chamber by way of restricted passage 49, the piston 45 is caused to move in a direction toward the left hand against the opposing pressure of spring 42. Movement of piston 45 in this direction effects movement of the toothed portion 30 of the latch member 31 out of engagement with the toothed portion 29 of the lever 15, in the manner hereinbefore described so that the lever and thereby the fulcrum pin 18 are again unlocked.

Now if the load on the vehicle has been varied during the interval of time that the brakes on the vehicle were applied and the brake pipe depleted of fluid under pressure, the spring 27 acting through the medium of spring seat 25 and pin 23 will, due to vertical relative movement between the bolster 1 and the spring plank 2, cause lever 15 to rock about the pin 14 and adjust the fulcrum pin 18 in accordance with the load on the vehicle.

Now when the pressure in chamber 47 of the reset cylinder 46 and the volume reservoir 53 equalize and with further supply of fluid under pressure to the chamber 47 cut off, the pressure in the chamber and the connected reservoir are vented to the atmosphere by way of the restricted passage 49. Upon a sufficient reduction in pressure in chamber 47, the spring 42 will act as already described to effect locking of the lever 15 and thereby the fulcrum pin 18 in its adjusted position.

It will be understood from the foregoing description that if the brakes are in their released condition at the time the brake pipe is being charged with fluid under pressure, the unlocking of the fulcrum shifting lever 15 will be accomplished in response to the pressure of fluid supplied from the brake pipe by way of the open valve devices 50 and 51.

If, however, the brakes are in their applied condition fluid at brake cylinder pressure in chamber 67 of the valve device 51 maintains the valve 73 seated until such time as the pressure of fluid in the brake cylinder and chamber 67 has been reduced sufficiently to effect the release of the brakes. This reduction will be initiated by the usual brake controlling valve device when the brake pipe has been increased to around fifty pounds. During this brake pipe charging period fluid at brake cylinder pressure in chamber 67 acts to maintain the valve 73 seated, so that the reservoir 53 will be charged with fluid until such time as the brake pipe pressure has been increased to around thirty pounds. When this occurs the valve device 50 functions to cut off the further flow of fluid to the reservoir 53. Since the valve 73 is maintained closed by brake cylinder pressure the fluid stored in the reservoir will be at a pressure of about thirty pounds as determined by the setting of the valve device 50. When the brake cylinder pressure is reduced sufficiently to effect a release of the brakes the valve 73 is moved to its unseated position so as to permit the fluid stored in reservoir 53 to flow to the piston chamber 47, the pressure of fluid thus admitted to chamber 47 causing the piston to function to effect the unlocking of the fulcrum shifting lever 15. It will be noted that the fluid stored in the reservoir 53 thus provides for the unlocking of the lever 15 when the brake pipe has been increased to around fifty pounds even through the communication from the brake pipe has already been closed by the slide valve 62 of the valve device 50 in response to the increase in brake pipe pressure to thirty pounds.

Having now described my invention, what I claim as new and desire to secure by Letters Patent is:

1. In a variable load brake apparatus for a vehicle truck of the type having a fixed spring plank and a truck bolster vertically movable relative to the spring plank in response to variations in the weight imposed thereon, in combination, a brake lever operatively connected at one end to a brake member to be operated, a brake cylinder carried by said bolster and connected to the other end of said lever, said brake cylinder being operative to actuate the lever and thereby said member, a slotted opening in said lever extending longitudinally of the lever intermediate its ends, a fulcrum for said lever disposed in said slotted opening, a lever carried by said bolster and operatively connected to said spring plank operative to shift said fulcrum along said brake lever, and locking means carried by said bolster for locking the second mentioned lever against operation by relative movement between said bolster and said spring plank.

2. In a variable load brake apparatus for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative upon the supply of fluid under pressure thereto to actuate the lever and thereby the member to effect an application of the brakes, a slotted opening in said lever extending longitudinally of the lever intermediate its ends, a fulcrum element for said lever disposed in said slotted opening, fulcrum shifting means responsive to relative movement between a sprung and an unsprung part of the vehicle for shifting said fulcrum element along the brake lever, fluid pressure responsive means operative upon an increase in the pressure of fluid acting thereon to unlock said fulcrum shifting means to permit the fulcrum shifting means to be actuated and operative upon a reduction in the pressure of fluid acting thereon to lock said fulcrum shifting means in any position to which it has been moved, valve means normally establishing communication through which fluid under pressure may flow to said fluid pressure responsive means, and a valve device responsive to the pressure of fluid supplied to said brake cylinder in effecting an application of the brakes to render said valve means ineffective to control the flow of fluid under pressure to said fluid pressure responsive means.

3. In a variable load brake apparatus for a vehicle of the type having a fixed part and a part movable vertically relative to the fixed part in response to variations in the weight imposed thereon, in combination, a brake lever operatively connected at one end to a brake member to be operated, a brake cylinder connected to the other end of said lever and operative upon the supply of fluid under pressure thereto to actuate the lever and thereby the member to effect an application of the brakes, a slotted opening in said lever extending longitudinally of the lever intermediate its ends, a fulcrum element for said lever disposed in said slotted opening, fulcrum shifting means movable in response to relative movement between a sprung and an unsprung part of the vehicle for shifting said fulcrum element along the brake lever, locking means for locking said adjusting means and thereby said fulcrum in any selected position, fluid pressure operated means for actuating said locking means to its unlocking position, a brake pipe normally deplete of fluid under pressure adapted to be charged with fluid under pressure for control of the brakes on the vehicle, valve means controlled by brake pipe pressure for controlling the supply of fluid under pressure to the fluid pressure operated means, and a valve device operative by fluid under pressure supplied to the brake cylinder in effecting an application of the brakes to render said valve means ineffective to control the flow of fluid under pressure to said pressure responsive means.

CECIL S. KELLEY.